UNITED STATES PATENT OFFICE.

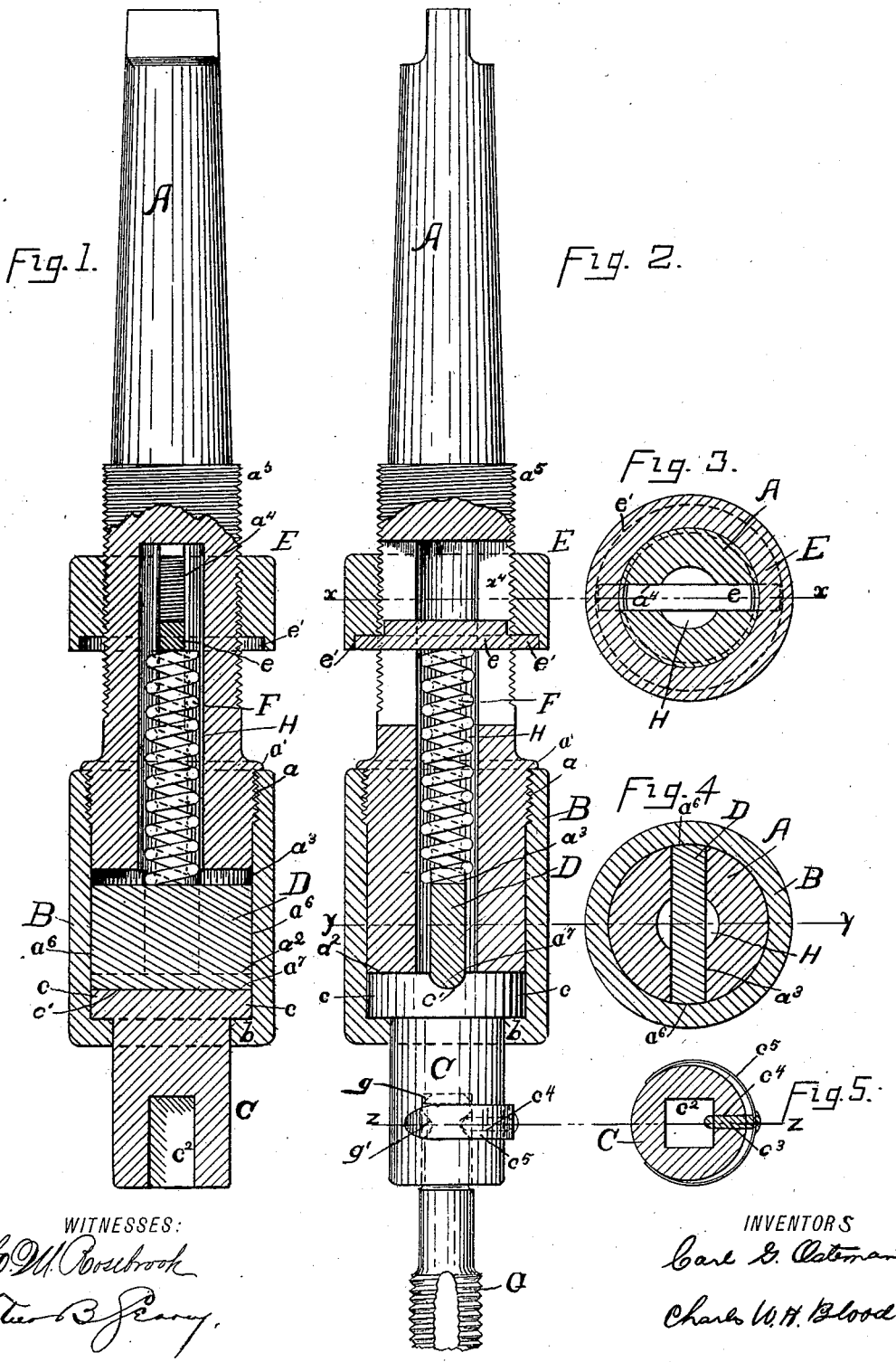

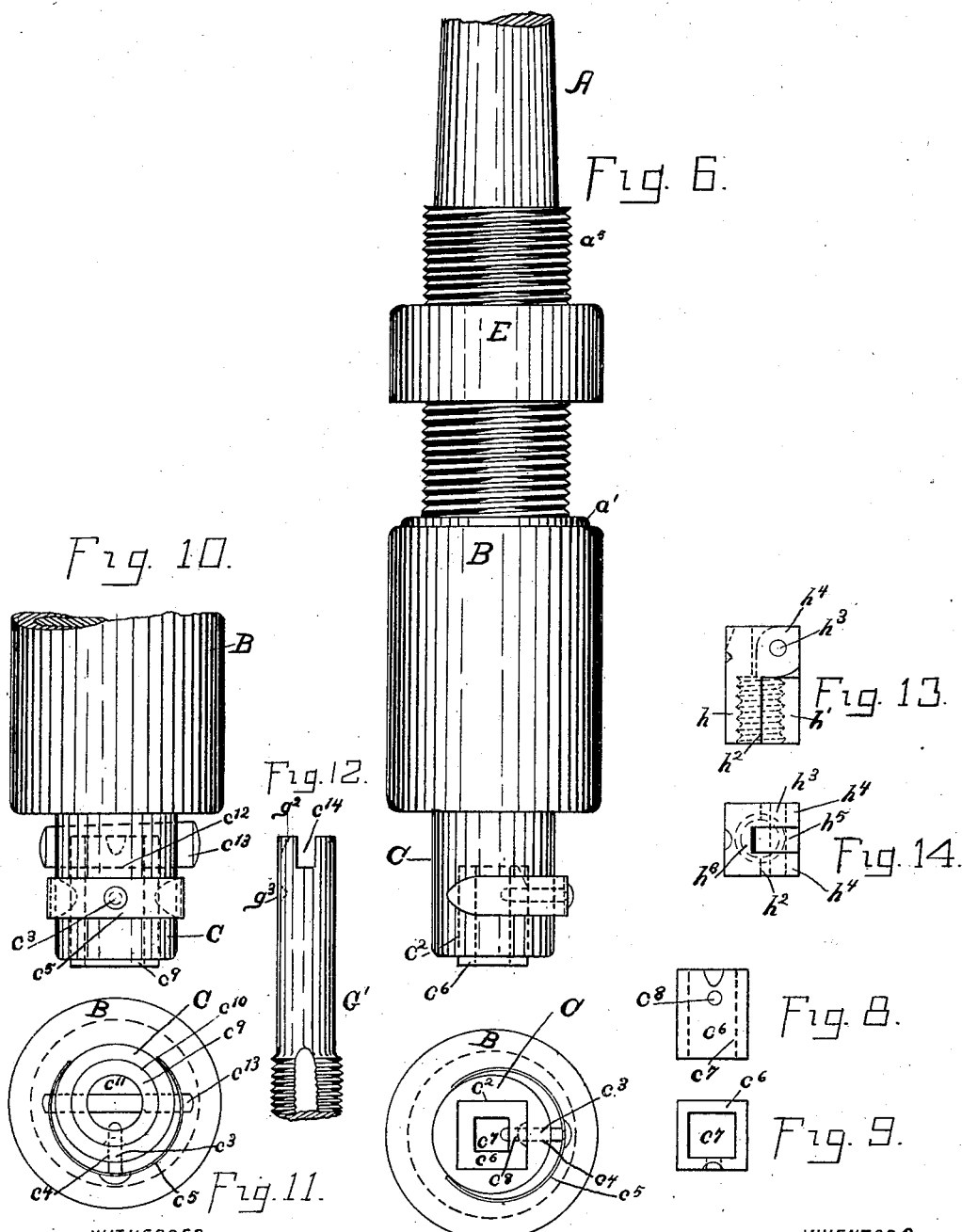

CARL G. OSTEMAN AND CHARLES W. H. BLOOD, OF BOSTON, MASSACHUSETTS; SAID OSTEMAN ASSIGNOR TO SAID BLOOD.

TAPPING AND STUD-SETTING DEVICE.

SPECIFICATION forming part of Letters Patent No. 710,116, dated September 30, 1902.

Application filed May 20, 1896. Serial No. 592,371. (No model.)

*To all whom it may concern:*

Be it known that we, CARL G. OSTEMAN and CHARLES W. H. BLOOD, citizens of the United States, and residents of Boston, in the county of Suffolk and State of Massachusetts, have invented certain new and useful Improvements in Tapping and Stud-Setting Devices, of which the following, taken in connection with the accompanying drawings, is a specification.

Our invention relates to devices which may be secured to or comprise a part of the spindle of a drilling-machine, lathe, or tapping-machine for the purpose of drilling and tapping holes or setting threaded studs or similar operations.

In the process of tapping holes it is necessary to rotate the tap in one direction until the desired thread is cut and then to reverse the rotation in order to back the tap out and remove it from the hole.

In the most approved form our device comprises a shank which may be attached to or comprise a part of the spindle of the machine, a tap-holder adapted to engage the shank of a tap, and a driver forming a driving connection between the shank and the tap-holder for the purpose of driving the latter either forward or back, as the direction of the machine-spindle may be.

An important object of our invention is to so construct the device that the engagement between the driver and the tap-holder will be only of sufficient strength to drive the latter when the tap is meeting with its ordinary or safe cutting resistance, but to throw out of engagement when for any reason the resistance is increased beyond a safe limit.

In the accompanying drawings, Figure 1 is an axial section of a device embodying our invention. Fig. 2 is a similar section taken at right angles to the section of Fig. 1. Fig. 3 is a cross-section of Fig. 2 on line X X through the adjusting-nut. Fig. 4 is a cross-section of Fig. 2 on line Y Y through the shank and driver. Fig. 5 is a cross-section of Fig. 2 on line Z Z through the tap-holder. Fig. 6 is a side view of the device. Fig. 7 is an end view of Fig. 6, showing the tap-holder and the bushings for holding different sizes of taps. Figs. 8 and 9 are a side and end view, respectively, of said bushings. Figs. 10 and 11 are a side and end view, respectively, of a modified form of tap-holder and bushing. Fig. 12 is a side view of a tap adapted to said modified bushing. Figs. 13 and 14 are a side and end view, respectively, of a bushing specially adapted for setting studs.

Similar letters of reference refer to similar parts throughout the several views.

In the figures, A designates the shank or main driving member of the device and in the form herein shown is adapted to fit in the taper socket of a drilling-machine, lathe, or tapping-machine of the usual construction. The shank A is threaded at $a$ to receive the thimble B, which is secured firmly in place against the shoulder $a'$, formed on A, said thimble being internally lipped or flanged at its lower end at $b$. The tap-holder C is outwardly flanged at $c$, engaging thereby with the inward flange $b$ of the thimble B, the latter thereby holding the tap-holder C in operative position against the lower end $a^2$ of the shank A. Suitable means for securing the tap in the holder C are provided, which will be hereinafter described.

Diametrically across the lower end of the shank A is formed the slot or pocket $a^3$, Figs. 1, 2, and 4, in which is operatively held the driver D, the slot or pocket $a^3$ being of sufficient depth to allow the driver freedom of movement longitudinally of the shank A. Bearing against the upper edge of the driver D and contained in the axial hole H is a spring F, said spring being supported and adjusted at its upper end by the nut E through the interposed cross-bar $e$ passing diametrically through the body of the shank A by means of the slot $a^4$. The nut E is adjustable on the shank A by means of the thread $a^5$ and engages with the cross-bar $e$ at the extended ends thereof, $e'$.

The driver D is made of suitable cross-section to be a working fit in the slot or pocket $a^3$, while its ends $a^6$ bear against the inner walls of the thimble B. The lower edge $a^7$ of the driver D is made of rounded or other suitable form, as shown in cross-section in Fig. 2, and engages with a corresponding groove $c'$ diametrically across the head of the tap-holder C. The form of the groove $c'$ and of the corresponding end $a^7$ of the driver D, engaging therewith, is such that when the latter is forced into operative engagement with the former an axial rotation of the spindle A will be transmitted through and by means of said driver to the tap-holder C against a considerable resistance of the latter; but upon the resistance being increased beyond a desired point the driver D will be forced out of engagement with the groove $c'$, due to the rounded or inclined edge of said driver, and the rotation of the tap-holder will cease, the driver alternately throwing out and into engagement with the groove as long as the spindle A rotates and the excessive resistance to the rotation of the tap-holder is maintained. In operation then the nut E is set to give the desired tension to the spring F, a forward rotation given to the device, and the tap G enters into the hole to be tapped. When the tap reaches the bottom of the hole or when for any other reason the resistance to the rotation of said tap is increased, the crowding-out action between the rounded engaging edge of the driver D and the groove $c'$ in the tap-holder C overpowers the pressure of the spring F, and said driver D will lift in the slot or pocket $a^3$ out of engagement with the groove $c'$ in the tap-holder C, and the rotation of the latter will cease. Upon reversing the rotation of the spindle A the reduced resistance of the tap in backing out will again permit the engagement between the driver and the tap-holder to be maintained, and the tap will be backed out of the hole.

For readily attaching and securing taps in the tap-holder C the latter is provided, as shown in Figs. 1, 2, and 5, with a square socket or recess $c^2$ in the end thereof adapted to receive the squared end of a tap of the usual construction. For readily inserting the tap and holding it in place in the socket we have provided the pin $c^3$, passing through the hole $c^4$ into the square socket $c^2$ and projecting a suitable distance thereinto. The outer end of the pin $c^3$ engages with the bow-spring $c^5$, said spring encircling the body of the tap-holder C a sufficient distance to cause it to draw the pin $c^3$ toward and into the square socket $c^2$.

The head of the tap G is squared to fit the socket $c^2$, and the end of said squared portion of the tap is beveled on one or more sides, as shown at $g$ in Fig. 2, so that when the tap is inserted in the socket $c^2$ the beveled portion of the end thereof will engage with the projecting end of the pin $c^3$, forcing it out against the pressure of the spring $c^5$. Below the beveled end $g$ the notch or depression $g'$ is provided, into which the pin $c^3$ will be forced as the tap is inserted farther into its socket, thereby providing an efficient means of holding the tap in place and readily inserting or removing the same.

The size of the square that it is convenient to make on the ends of taps of different sizes varies, and to provide for such variations we have provided the square bushings $c^6$, Figs. 6, 7, 8, and 9, said bushings being made of suitable outside dimensions to fit the squared socket $c^2$, while the tap-receiving hole $c^7$ may be made of proper square to receive the desired tap. In the side of the bushing is provided the hole $c^8$, which registers with the hole $c^4$ in the body of the tap-holder C when the bushing is in its proper position, whereby the pin $c^3$ is enabled to pass through the side of the bushing into the inner hole thereof. The pin $c^3$ is thereby enabled to engage with the head of the tap, as before described, and at the same time hold the bushing in its proper position in the socket $c^2$, so that the tap may be removed from the bushing without the bushing being released from engagement with the pin $c^3$.

For cheapening the cost of taps and of the bushings we may elect to substitute the form of bushing shown in Figs. 10 and 11 and the corresponding form of tap-shank shown in Fig. 12. In this construction the bushing $c^9$ may be made cylindrical, and the tap-holder C is made with the proper bore $c^{10}$ to receive it. The internal bore $c^{11}$ is made of suitable size to receive the shank of the tap G', Fig. 12, said shank in this construction being made cylindrical.

To keep the bushing from turning in the tap-holder C, a transverse slot or groove $c^{12}$ is made across the end of said bushing, which engages when the bushing is in place with the pin or key $c^{13}$, passing transversely through and across the tap-holder C and extending across and below the end of the socket $c^{10}$, thereby forming a raised rib across the bottom of said socket. The end of the tap G' is provided with a groove $c^{14}$, which also engages the rib or key $c^{13}$ when the tap is inserted into its operating position. The same means of the spring $c^5$ and the pin $c^3$ are provided with this bushing and tap for readily inserting and removing the same as are employed with the square bushing heretofore described, the tap G' being beveled at $g^2$ and notched at $g^3$, the latter registering with and engaging with the pin $c^3$ when the tap is inserted into the socket $c^{11}$. For adapting this device to the operation of setting or screwing in place threaded studs into holes tapped to receive them it is necessary to provide means for holding one end of the stud in engagement with what we have heretofore termed the "tap-holder" C, so that the necessary rotation may be derived therefrom. This may be accomplished by providing a suitable bushing to fit in the socket $c^2$ of the tap-holder C, said bushing being provided with an axial hole threaded to screw onto the required stud. By this means, however, considerable time is required to screw the stud into and out of the bushing, and to facilitate this operation the bushing shown in Figs. 13 and 14 is provided. As shown, the bushing is composed of two members $h\ h'$, dividing on the line $h^2$ and attached together by the pin $h^3$ passing through the ears $h^4$ of the member $h$ and the ear $h^5$ of the member $h'$, said ear $h^5$ fitting in between the ears $h^4$, and the pin $h^3$ passing through the whole, thereby forming a hinged joint, enabling the parts $h$ $h'$ to be swung open at the lower end thereof, separating on the line $h^2$, thus opening the bushing into approximately two halves. When closed, this bushing is of the same square as the socket in the tap-holder C, and when inserted therein it is firmly held in its closed position. At the lower or opening end of the bushing and divided by the separating-joint $h^2$ the axial hole $h^6$ is formed and threaded to adapt it to screw onto the desired stud, said hole ending within the bushing itself, so that when the end of a stud is screwed thereinto the stud will bring up against the bottom of said hole, and further turning of the stud within the bushing will be prevented.

In operation the hinged members of the bushing are opened, the end of the stud inserted, and the bushing closed thereon and then inserted into the socket $c^2$ of the tap-holder C. The whole device is then rotated and the stud screwed in the hole tapped to receive it. When the stud is firmly set or reaches the bottom of the hole receiving it, the clutch-driver D is crowded out of engagement with the tap-holder C, as in the case of tapping heretofore described; but instead of reversing the rotation of the device to free it from engagement with the stud the whole device is lifted, withdrawing the bushing from the socket $c^2$, which may then in turn be freed from the stud.

What we claim as our invention, and desire to secure by Letters Patent, is—

1. In a tapping and stud-setting device, the combination of a main spindle, a tap-holder operatively attached to the end thereof, a yielding clutch-driver inserted in the end of said spindle forming operative connection between the spindle and the tap-holder, an adjustable nut on the outside of said spindle, and means for applying pressure with said nut upon said clutch-driver, substantially as described and for the purpose set forth.

2. In a tapping and stud-setting device, the combination of a main spindle, a tap-holder operatively attached to the end thereof, a transverse groove across the abutting end of said tap-holder, a yielding clutch-driver inserted in the end of said spindle and engaging with the groove in the tap-holder, an adjustable nut on the outside of said spindle, and means for applying pressure with said nut upon said clutch-driver, substantially as described and for the purpose set forth.

3. In a tapping and stud-setting device, the combination of a main spindle, a tap-holder operatively attached to the end thereof, a yielding clutch-driver inserted in the end of said spindle forming operative connection between the spindle and the tap-holder, an adjustable nut on the outside of said spindle, and means for applying a yielding pressure with said nut upon the clutch-driver, thereby allowing the latter to release from engagement with the groove in the tap-holder, substantially as described and for the purpose set forth.

4. In a tapping and stud-setting device, the combination of a main spindle, a clutch-driver having an inclined edge inserted in a transverse slot across the end thereof, a tap-holder operatively attached to and abutting the end of said spindle, a transverse groove across the abutting end of said tap-holder and engaging with the inclined edge of said clutch-driver, and an adjustable nut on the outside of said spindle with means for engaging said nut with said clutch-driver for forcing the same into operative engagement with the tap-holder, substantially as specified and for the purpose set forth.

5. In a tapping and stud-setting device, the combination of a main spindle, a tap-holder operatively attached to the end thereof, a clutch-driver inserted in the end of said spindle, forming operative connection between the spindle and the tap-holder, a spring contained within a central bore in said spindle and bearing upon said clutch-driver and acting to force the same into operative engagement with the tap-holder, and a nut on the outside of said spindle and means for engaging the same with said spring, whereby the tension of the latter may be regulated, substantially as specified and set forth.

6. In a tapping and stud-setting device, the combination of a main spindle, a tap-holder held at one end thereof and operatively connected therewith by means of a self-acting clutch-driver, a central bore within said spindle forming a chamber for a spring, one end thereof bearing on said clutch-driver and the other end supported by means of a cross-bar passing transversely through the body of the spindle by means of suitable openings therein, the ends of said cross-bar extending beyond the sides of the spindle and engaging with, and adjustable by a nut thereon, substantially as and for the purpose specified.

7. In a tapping and stud-setting device, the combination of a main driving-spindle, an outwardly-flanged tap-holder abutting one end thereof, an inwardly-flanged thimble rigidly secured to said spindle, said inward flange on the thimble engaging with the outward flange of the tap-holder for holding the latter in operative position, and a clutch-driver of uniform cross-section inserted in a transverse slot across the end of said spindle and being positively driven thereby, and forming operative connection between said spindle and tap-holder, and adjustable means on the outside of said spindle for applying a yielding pressure upon said clutch-driver, substantially as specified and for the purpose set forth.

8. In a tapping and stud-setting device, the combination of a main driving-spindle, an outwardly-flanged tap-holder abutting one end thereof, an inwardly-flanged thimble rigidly secured to said spindle, said inward flange on the thimble engaging with the outward flange of the tap-holder for holding the latter in operative position, and a clutch-driver of uniform cross-section inserted in a transverse slot across the end of said spindle and retained in place laterally by the inner walls of said thimble, and adjustable means on the outside of said spindle for applying a yielding pressure upon said clutch-driver, substantially as specified and for the purpose set forth.

9. In a tapping and stud-setting device, the combination of a tap-holder or head and means for driving the same, a polygonal recess or socket in the end thereof, a bushing adapted to fit said socket, and a pin passing through the side of said socket and bushing and projecting to and into the tap-receiving hole in the latter and engaging with a tap therein, thereby holding the bushing and tap in position and enabling the latter to be removed without disturbing the former, substantially as specified and for the purpose set forth.

10. In a tapping and stud-setting device, the combination of a tap-holder or head and means for driving the same, a polygonal recess or socket in the end thereof, a bushing adapted to fit said socket, and a pin passing through the side of said socket and bushing and extending to and into the tap-receiving hole in the latter and adapted to engage with a tap therein, and a spring engaging with the outer end of said pin for forcing it into engagement with the tap, substantially as specified and for the purpose set forth.

11. In a tapping and stud-setting device, the combination of a tap-holder or head and means to drive the same, a socket in the end thereof, a bushing consisting of two or more wings or members capable of being spread apart or opened from each other, a threaded hole formed in the end between said adjoining members and adapted to engage the end of a threaded stud, said bushing when closed being adapted to fit in the tap-holder socket and prevented from opening thereby, substantially as specified and for the purpose set forth.

12. In a tapping and stud-setting device, the combination of a tap-holder or head and means for driving the same, a socket in the end thereof, a bushing consisting of two or more wings or members capable of being spread apart or opened from each other, a threaded hole formed in the end between said adjoining members and adapted to engage the end of a threaded stud, said bushing being adapted for attachment to the tap-holder or head for the purpose specified and set forth.

In testimony whereof we have signed our names to this specification, in the presence of two subscribing witnesses, on this 31st day of March, A. D. 1896.

CARL G. OSTEMAN.
CHARLES W. H. BLOOD.

Witnesses:
WILLIAM A. PURDY,
JAMES CONLEY.